Patented Dec. 19, 1944

2,365,383

UNITED STATES PATENT OFFICE 2,365,383

DRILLING MUD

Donald C. Bond, Northbrook, Ill., assignor to The Pure Oil Company, Chicago, Ill., a corporation of Ohio No Drawing. Application June 9, 1943, Serial No. 490,191

18 Claims. (Cl. 252—8.5)

This invention relates to drilling wells and is primarily concerned with the production of an improved drilling mud and composition for preparation thereof for use in the drilling of wells, especially oil and gas wells, and with the method of drilling wells wherein such muds are used. This application is a continuation-in-part of my co-pending application Serial No. 303,024 filed November 6, 1939, entitled Improved drilling mud.

Drilling operations are usually conducted in the presence of a circulation of mud, that is, water containing mineral matter such as clay in a finely divided or deflocculated state. Such drilling muds are used in almost all rotary drilling operations for deep wells for oil and gas and simultaneously serve several functions. The mud is used primarily to carry the cuttings from the hole and to lubricate the drill bit, and in addition provides a lining or sheath on the walls of the drill hole to prevent either flow of water or gas from the sub-surface formation into the drill hole or to prevent loss of drilling fluid from the hole into the formations through which the hole is drilled. These muds are frequently made from material native to the formation in which the well is drilled, although it is often necessary to add additional material to the mud which will increase the specific gravity in order to increase the weight of the column of mud in the well and thereby offset the effect of high gas pressure. For this purpose weighting materials such as iron oxide and barytes are commonly used. Every natural clay contains particles of many orders of magnitude, some being coarse enough to settle out of a water suspension quickly and others being fine enough to stay suspended for indefinite periods. In a clay that is considered good for drilling purposes the fine material is predominant and is in an indefinitely fine state of subdivision, the finest being so small that much or most of it can be said to be in the form of a colloidal suspension or dispersion when the clay has been mixed with water. The suspended particles obey the general rules of colloidal dispersions, the degree of dispersion being increased by some ions and chemicals and being decreased by others. An increase in the degree of dispersion is termed "deflocculation" and a decrease in the state of dispersion is termed "flocculation." Flocculated clay may be in an equally finely divided state to that of deflocculated clay but the flocculated material will come together in flocculent, loose clumps or aggregates which settle readily from the medium in which it is dispersed, which in the case of drilling muds, is generally water. The stability of colloidal dispersions is also directly related to the charges on the dispersed particles. In general it may be said that strongly charged negative or positive particles form stable dispersions, whereas weakly charged or neutral particles tend to flocculate and settle out of the disperse medium.

When drilling in some formations such as, for example, certain shale formations, considerable difficulty has been experienced due to the property of these shale formations of swelling and sloughing when contacted with water or ordinary drilling mud. This property of some formations to hydrate or absorb water and swell sometimes occurs to such an extent that the holes cave and fill to such a degree that in the end the drilling has to be abandoned. Formations which have this property of absorbing water and swelling are, in the well drilling art, generally termed "heaving-shale" formations and it is with these types of formations that this invention is particularly concerned.

It is an object of this invention to provide an improved composition useful in the preparation of drilling mud.

It is another object of this invention to provide an improved drilling mud which will prevent the heaving of heaving-shale formations.

It is a still further object of this invention to provide a drilling mud in which the colloidal mineral content is dispersed as positively charged particles.

A further object of this invention is to provide an improved method for drilling in heaving-shale formations.

Various other objects and advantages will appear as the description of the invention proceeds.

Colloidally dispersed clay, obeying the general rules of colloidal dispersions, carries an electrical charge. Practically all naturally occurring finely divided clays such as kaolin and bentonite carry negative charges on the dispersed particles when dispersed in an aqueous medium. It is known that the shale in heaving-shale formation is generally bentonitic in character and that upon being dispersed in water carries a negative charge. It has now been found that if the colloidally dispersed particles, generally clay, in drilling muds are positively instead of negatively charged, the swelling of heaving-shale can be prevented or lessened to a great extent.

In the preparation of drilling mud it is generally desirable to use a finely divided solid which will have a high colloidal dispersion in water so as to produce a viscous, relatively stable mud with a minimum amount of solids. Bentonite has the aforesaid property and has been found to be a particularly satisfactory clay for use in drilling mud. Like other similar clays, bentonite carries a negative electrical charge when colloidally dispersed in an aqueous medium.

It has been found that such negatively charged colloids may be changed to positive colloids by the addition of one or more suitable water soluble chemical compounds from the group: salts of metals wherein the positive valence is three or more, such as thorium, aluminum, cerium and lanthanum salts; acid proteins such as acid gelatin or casein; basic dyes such as methylene blue, methylene green, methylene grey, methyl violet, Bismarck Brown R, Rhodamine B, acriflavine, chrysoidin Y and chrysoidin R. By the addition of one or more of the foregoing materials, the negatively charged colloidal clay or bentonite may be first neutralized and flocculated and upon a further addition, the neutralized clay may be deflocculated and remain in a stable dispersed state as positively charged particles. It is not desirable to use the flocculated, neutralized particles in drilling mud since these particles are not stably dispersed, the particles readily settling from an aqueous dispersion medium. When such a positively charged clay as, for example, bentonite, is dispersed in water and used as drilling mud, the shale in heaving-shale formations does not swell or slough off into the hole thereby preventing hydration and swelling of the heaving shale.

In order to determine the effectiveness of polyvalent metal salts having a valence of 3 or more in the preparation of positively charged muds, a series of muds were made by suspending Alabama haemitite in water and adding various amounts of thorium nitrate and aluminum chloride. The settling rate, consistency and effect on shale were noted and the charge in some cases was determined by cataphoresis tests using the Burton apparatus. The composition of the solutions and the results of the observations are set forth in Table I.

Table I

| Mixture No. | Grs. of Ala. haemitite | Salt | Cc. of 1 molar salt solution | Cc. H₂O | Settling in 24 hrs. mm. | Consistency | Effect on shale in 14 days | Charge |
|---|---|---|---|---|---|---|---|---|
| 1 | 50 | Th(NO₃)₄ | 1 | 99 | 25 | Fluid | | |
| 2 | 50 | do | 2 | 98 | 22 | do | | |
| 3 | 50 | do | 5 | 95 | 18 | do | | |
| 4 | 50 | do | 10 | 90 | 12 | do | None | |
| 5 | 50 | do | 20 | 80 | 6 | Thixotropic fluid | do | Slightly positive. |
| 6 | 50 | do | 25 | 75 | 4 | do | do | Do. |
| 7 | 50 | do | 30 | 70 | 1 | do | do | |
| 8 | 50 | do | 35 | 65 | 0.5 | do | do | |
| 9 | 50 | AlCl₃ | 25 | 75 | 23 | | do | |
| 10 | 50 | do | 35 | 65 | 10 | | do | |
| 11 | 50 | do | 50 | 50 | 8 | | do | |
| 12 | 50 | do | 60 | 40 | 3 | | do | Positive. |
| 13 | 50 | do | 70 | 30 | 4 | | do | |
| 14 | 50 | do | 80 | 20 | 8 | | do | |

It will be seen from the table that those mixtures which had a positive charge did not cause swelling of the shale and the mixtures were rather stable since very little settling occurred.

Another series of mixtures was prepared using bentonite, basic dye and thorium nitrate. The stability and the charge of these various mixtures were determined. The compositions of the various mixtures and observations made in connection therewith are set forth in Table II.

Table II

| Mixture No. | Dye | Cc. of 5% dye | Salt | Cc. of 1N salt solution | Suspensoid | Amount of suspensoid | Amount of H₂O | Stability | Charge |
|---|---|---|---|---|---|---|---|---|---|
| 18 | Methyl violet | 10 | Th(NO₂)₄ | 1.5 | Bentonite (5% suspension). | 50 | Mud diluted to 100 cc. | Flocculated in 1 day. | None. |
| 28 | do | 20 | | 0.0 | do | 50 | do | Solid floc | Do. |
| 26 | do | 15 | Th(NO₂)₄ | 3.0 | do | 50 | do | O. K. | Slightly positive. |
| 27 | do | 20 | do | 3.0 | do | 50 | do | O. K. | Positive. |
| 19 | do | 20 | do | 1.5 | do | 50 | do | O. K. | Do. |
| 35 | Methylene blue | 30 | | 0.0 | do | 50 | do | Flocculated | None. |
| 34 | do | 30 | Th(NO₂)₄ | 2.5 | do | 50 | do | O. K. | Positive. |
| 32 | do | 10 | do | 2.5 | do | 50 | do | 2 cc. settled in 18 hrs. | None. |
| 29 | do | 10 | do | 2.0 | | 50 | do | 9 cc. settled in 18 hrs. | Do. |
| 31 | do | 30 | do | 2.0 | do | 50 | do | O. K. | Positive. | and the bentonite particles remain stably dispersed. The ability of the positively charged bentonite to prevent swelling of the shale is believed to be due to neutralization of the negative charges on the shale particles in the subsurface formation by the positive charges on the bentonite in the drilling mud with resultant formation of a flocculated film of shale and bentonite on the exposed surface of the shale formation in the bore hole. The flocculated material forms an extremely coherent layer and adheres tightly to the surface of the formation, thus substantially preventing further neutralization of charges between the clay of the shale formation and the bentonite in the drilling mud and at the same time substantially preventing the ingress of further water to the formation, Mixture No. 28, which contained no thorium nitrate gave no charge on the cataphoresis test and produced solid flocculation when permitted to stand. Mixture No. 19, which contained the same amount of dye as mixture No. 28 and in addition 1.5 cc. of thorium nitrate had a positive charge and the stability was satisfactory. No flocculation occurred in this mixture upon standing for one day. The same is true of mixture No. 27, which contained 3 cc. of thorium nitrate. Mixture No. 26 was also satisfactory, although the amount of dye had been reduced to 1.5 cc.

Mixture No. 35, which contained 30 cc. of methylene blue and no thorium nitrate, was not stable and the mixture showed no charge on the cataphoresis test. By adding 2.5 cc. of thorium nitrate to the same mixture as in mixture No. 34, the mixture showed a positive charge and was stable. The same was true of mixture No. 31 containing 2 cc. of thorium nitrate. A reduction in the amount of dye without increasing the amount of thorium nitrate present resulted in a mixture which showed no charge and was somewhat unstable, as demonstrated by mixtures Nos. 29 and 32.

When two materials of opposite electrical charge react, the amount of each material which is affected is inversely proportional to the proportion of replaceable base which is present in a given weight of the particular material. In view of the variations in the amount of replaceable base in the various dispersed particles such as bentonitic clays, and in the varying degree of effectiveness with which the various salts impart positive charges to colloidally dispersed particles, it is apparent that the relative quantities of clay or other material to be suspended and salt may vary over a rather wide range. The amount of salt required may be readily determined by a cataphoresis test using a Burton apparatus or other similar testing device. An amount of additive, somewhat in excess of that amount required to impart a positive charge to the dispersed particles, is preferably used. In general, the amounts of the salts which are used fall between the ranges of 1 part of salt to 5 parts of of dry bentonite or other material, to 3 parts of salt to 1 part of dry bentonite or other material to be suspended. While the salt may be mixed with the material to be suspended in the dry state and the mixture subsequently dispersed in water as required, it is preferred to add the salt dissolved in water to mud in which the bentonite or other material to be suspended is already dispersed.

The term "bentonite" as used herein is used in a generic sense as including all clays having highly colloidal characteristics whether or not they are true bentonite. The salts which are useful are those polyvalent metal salts having a valence of three or more and are sufficiently soluble in water to impart the desired positive charge to the suspended material.

Instead of using a polyvalent salt alone to obtain the desired charge, a combination of salt and basic dye or acid protein may be used to obtain the desired charge.

While an effort has been made to explain the theory by which positively charged colloidally dispersed particles in drilling mud provide drilling mud which prevents the heaving of heaving-shale formations, it will be understood that the invention is not to be limited by any particular theory of operation.

It is claimed:

1. In the drilling of earth bores the step of circulating through the bore during the drilling operation a mud containing positively charged suspended mineral particles to which the positive charge has been imparted by soluble salts of metals, selected from the group consisting of aluminum, thorium, cerium and lanthanum.

2. In the drilling of earth bores, the step of circulating through the bore during the drilling operation mud containing normally negatively charged colloidally dispersed mineral particles and sufficient soluble salts of metals, selected from the group consisting of aluminum, thorium, cerium and lanthanum to impart a positive charge to said mineral particles.

3. In the drilling of earth bores, the step of circulating through the bore during the drilling operation a mud containing suspended bentonite and weighting material and sufficient soluble salts of metals, selected from the group consisting of aluminum, thorium, cerium and lanthanum to impart a positive charge to the bentonite.

4. A drilling mud comprising an aqueous suspension of normally negatively charged solid particles and sufficient soluble salts of metals, from the group consisting of aluminum, thorium, cerium and lanthanum to impart a positive charge to said particles.

5. A drilling mud comprising an aqueous suspension of bentonite and sufficient soluble salts of metals, selected from the group consisting of aluminum, thorium, cerium and lanthanum to impart to the bentonite a positive charge.

6. A drilling mud in accordance with claim 5 containing barite.

7. A drilling mud comprising an aqueous suspension of positively charged solid particles of colloidal size to which the positive charge has been imparted by soluble salts of metals, selected from the group consisting of aluminum, thorium, cerium and lanthanum.

8. A composition useful in the preparation of drilling muds comprising a mixture of bentonite and soluble salts of metals selected from the group consisting of aluminum, thorium, cerium and lanthanum, the soluble salts of metals being present in amount sufficient to impart to the bentonite particles a positive charge when suspended in water.

9. A composition useful in the preparation of drilling mud comprising comminuted solid mineral particles having a negative charge when suspended in water and sufficient salts of metals selected from the group consisting of aluminum, thorium, cerium and lanthanum to impart a positive charge to said particles when suspended in water.

10. In the drilling of earth bores the step of circulating through the bore during the drilling operation mud containing positive charged suspended mineral particles to which the positive charge has been imparted by the combination of a basic dye and a salt of a metal selected from the group consisting of aluminum, thorium, cerium and lanthanum, the dye or the salt alone being insufficient to impart the positive charge.

11. The step in accordance with claim 10 in which the dye is methylene blue.

12. The step in accordance with claim 10 in which the salt is thorium nitrate.

13. The step in accordance with claim 10 in which the dye is methylene blue and the salt is thorium nitrate.

14. A composition useful in the preparation of drilling mud comprising bentonite, basic dye and a salt of a metal selected from the group consisting of aluminum, thorium, cerium and lanthanum, the amount of basic dye and salt being sufficient to impart a positive charge to the bentonite when suspended in an aqueous medium, the dye or the salt alone being insufficient to impart the positive charge.

15. A composition in accordance with claim 14 in which the salt is thorium nitrate.

16. A composition in accordance with claim 14 in which the salt is thorium nitrate, and the dye is methylene blue.

17. The step in accordance with claim 1 in which the salt is a thorium salt.

18. The step in accordance with claim 1 in which the salt is thorium nitrate.

DONALD C. BOND.